No. 675,192. Patented May 28, 1901.
W. A. BONSACK.
NUT OR BOLT LOCK.
(Application filed Dec. 5, 1900.)
(No Model.)
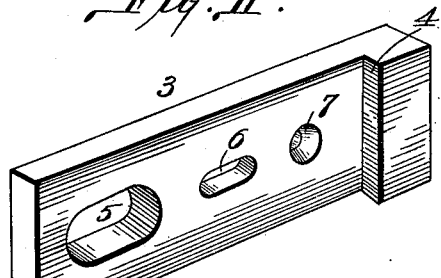
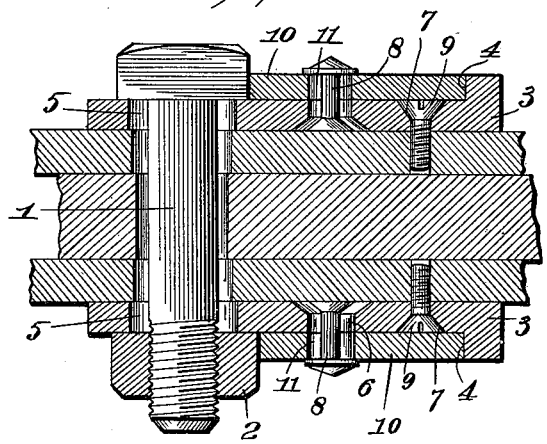
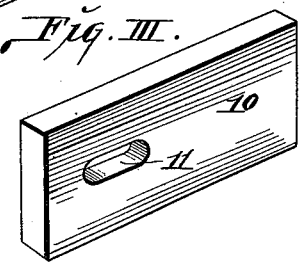
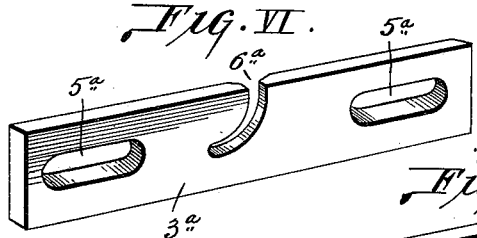
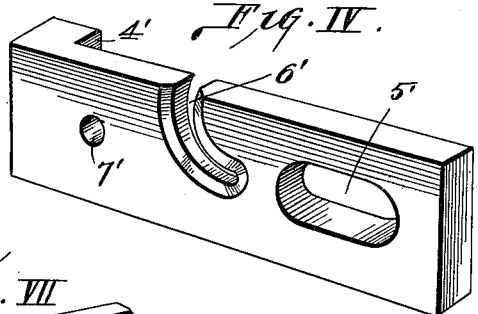
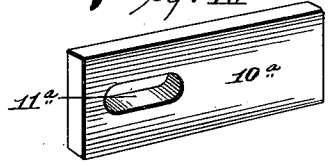
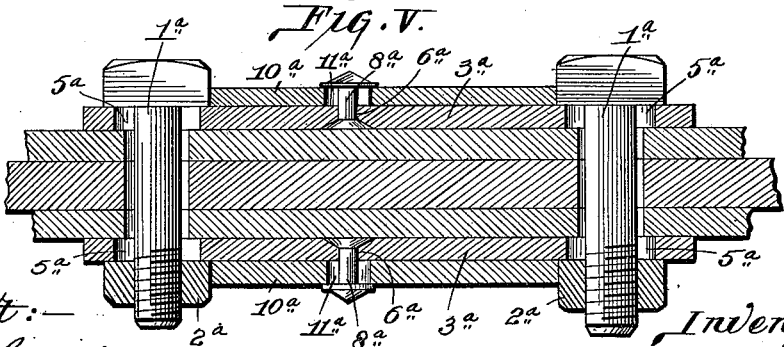
Attest:— M. P. Smith, T. S. Knight
Inventor:— Wm. A. Bonsack. By Wright Bro, Atty's.
THE NORRIS PETERS CO., PHOTO-LITHO., WASHINGTON, D. C.

UNITED STATES PATENT OFFICE.

WILLIAM A. BONSACK, OF ST. LOUIS, MISSOURI.

NUT OR BOLT LOCK.

SPECIFICATION forming part of Letters Patent No. 675,192, dated May 28, 1901.

Application filed December 5, 1900. Serial No. 38,758. (No model.)

*To all whom it may concern:*

Be it known that I, WILLIAM A. BONSACK, a citizen of the United States, residing in the city of St. Louis, in the State of Missouri, have invented certain new and useful Improvements in Nut or Bolt Locks, of which the following is a full, clear, and exact description, reference being had to the accompanying drawings, forming part of this specification.

My invention relates to locks for holding nuts and bolts from turning; and, briefly stated, it consists in a washer and locking-plate provided with elongated openings that receive the bolts and means for securing the locking-plate to the washer, whereby the parts are rendered adjustable with relation to the members to be held thereby.

The features of novelty will be hereinafter fully described and claimed.

Figure I is a longitudinal sectional view showing my lock applied to a nut and bolt. Fig. II is a perspective view looking at the face of the washer. Fig. III is a perspective view of the locking-plate. Fig. IV is a rear perspective view of the washer provided with a slot for the rivet that secures the locking-plate to said washer. Fig. V is a longitudinal sectional view showing a double locking means applied to two nuts and bolts in common. Fig. VI is a perspective view of the washer used in the double lock shown in Fig. V. Fig. VII is a perspective view of the locking-plate used in the double lock shown in Fig. V.

1 designates a bolt, and 2 a nut, of any common form.

3 designates a washer having a shoulder 4 and provided with an elongated opening 5 for the bolt 1, passed therethrough, and an elongated opening 6 for a rivet 8, by which the locking-plate 10 is secured to the washer between the shoulder 4 and the nut or bolt to be held. The washer 3 is also provided with an aperture 7, that receives a fastener 9, such as a screw, by which the washer is held in a fixed position, the fastener being set into the part held by the bolt and nut, as seen in Fig. I.

The locking-plate 10 is provided with an elongated opening 11, that receives the rivet 8, inserted in the openings 6 and 11, and by which the locking-plate is secured to the washer 3.

In Fig. IV, I have shown the opening in the washer 3' that receives the rivet in the form of a curved slot 6', extending to the edge of the washer.

In practical use the lock is applied to the nut and bolt in the following manner: The washer 3, with the rivet 8 therein, is first put in position before the bolt is inserted or the nut placed thereon, and the washer is secured by the fastener 9. The bolt is then inserted and the nut screwed thereonto to the desired extent. The locking-plate 10 is then put in place against the washer, so that the rivet 8 will pass therethrough, and the locking-plate being thus positioned between the members to be held and the shoulder 4 is secured by the rivet 8. In the positioning of the washer 3 the elongated opening 5 provides for the proper placing of the washer and obviates the necessity of perfect alinement of said openings 5 with the bolt. The elongated opening 6 in the washer and the elongated opening 11 in the locking-plate provide for the proper positioning of said plate, so that the plate may be adjusted to or from either the bolt-head or nut to be secured, so that the locking-plate may be brought into firm contact with the member to be held. This feature is of material importance, particularly where bolts and nuts of varying sizes are utilized.

In Figs. V to VII, inclusive, I have shown a double lock whereby two bolts or nuts may be held. In this form of device the washer 3ª is provided with two elongated openings 5ª and two elongated openings 6ª. The heads of the bolts 1ª and nuts 2ª are held by the locking-plates 10ª, which are provided with elongated openings 11ª, that receive securing-rivets 8ª, which pass through the elongated openings 6ª in the washer. The opposing nuts and bolts are thereby held from turning, inasmuch as any inclination of one of them to turn is overcome by the opposing member. The washers and locking-plates being provided with the elongated openings referred to render it possible to adjust said parts in either direction in applying the lock, so that the locking-plates will occupy the proper positions between the members held thereby.

I claim as my invention—

1. In a nut or bolt lock, the combination of a washer, provided with an elongated opening through which the bolt passes, a rivet applied to said washer, and a locking-plate provided with an elongated opening adapted to receive said rivet, substantially as described.

2. In a nut or bolt lock, the combination of a washer through which the bolt passes, said washer being provided with an elongated opening for the reception of said bolt, and an elongated opening for the reception of a rivet, said rivet, and a locking-plate positioned against said washer and provided with an elongated opening for the reception of said rivet, substantially as described.

WILLIAM A. BONSACK.

In presence of—
E. S. KNIGHT,
M. P. SMITH.